Sept. 23, 1969     B. DOYLE     3,468,608

LASER ANGULAR RATE SENSOR

Filed Dec. 2, 1966

INVENTOR.
BARRETT DOYLE
BY *Charles J. Ungemach*

ATTORNEY

United States Patent Office

3,468,608
Patented Sept. 23, 1969

3,468,608
LASER ANGULAR RATE SENSOR
Barrett Doyle, New Brighton, Minn., assignor to Honeywell Inc., Minneapolis, Minn., a corporation of Delaware
Filed Dec. 2, 1966, Ser. No. 598,660
Int. Cl. G01b 9/02
U.S. Cl. 356—106                                7 Claims The present invention relates to rotation measuring apparatus, and more particularly to apparatus and techniques for preventing frequency coupling in devices which compare the frequencies of two counter-rotating beams of light as a measure of rotation. Although the present invention is described with reference to the use of laser produced light, it should be understood that the new and novel techniques disclosed are equally applicable to rotation measuring devices which utilize any electromagnetic radiation.

In a laser angular rate sensor, or ring laser, two monochromatic beams of light are propagated in opposite directions around a closed loop path enclosing an axis of rotation. Rotation of the apparatus about the axis causes the effective path lengths for the two beams to change oppositely, thus producing a frequency difference between the two beams since the frequency of oscillation of the laser is dependent upon the length of the lasing path.

The frequency difference between the two beams comprises an output signal which may be measured to determine the rate of rotation. However, at low rotational rates when the difference in frequency is small, the two beams of light tend to resonate together or "lock-in" so that the two beams oscillate at only one frequency. Thus, it becomes impossible to read low rotational rates because the frequency difference, which is proportional to the rotational rate, ceases to exist at these low rates.

This problem may be avoided by introducing into the path of the beams a transparent disc rotating or spinning about an axis oblique to the path. At the point where the counter-rotating beams pass through the transparent spinning disc the material of the disc is actually moving with a component aligned with the path of the beams. Due to the "Fresnel Drag" effect this motion along the beam causes an effective change in the index of refraction, which change is different for the two oppositely traveling beams of light. As a result, even when no rotation of the apparatus about its axis is present the two counter-rotating beams have effectively different path lengths and thus are biased so as to have a predetermined frequency difference large enough to avoid the frequency "lock-in" which occurs when the frequencies of the two beams are too close together.

Since the device operates to measure rotation by measuring the frequency difference between the two beams and since this frequency difference is due in part to the biasing caused by the spinning disc, any variation in the speed of the mechanically rotating disc causes a variation in the frequency bias, and it is desirable to nullify the effects this variation in bias. The present invention accomplishes this by providing a second pair of counter-rotating laser beams of the same size which pass through the other side of the spinning disc and thus are biased in the reverse sense from the first pair of beams. The output signal from the second pair of beams is subtracted from the output signal from the first pair of beams so that the effects of the spinning disc are eliminated from the ultimate output signal.

Accordingly, it is an object of the present invention to provide improved means for maintaining a frequency difference in a laser angular rate sensor so as to avoid a "lock-in" of the two beams. Further objects and advantages will become apparent in the following descriptions and drawings in which.

Figure 1:
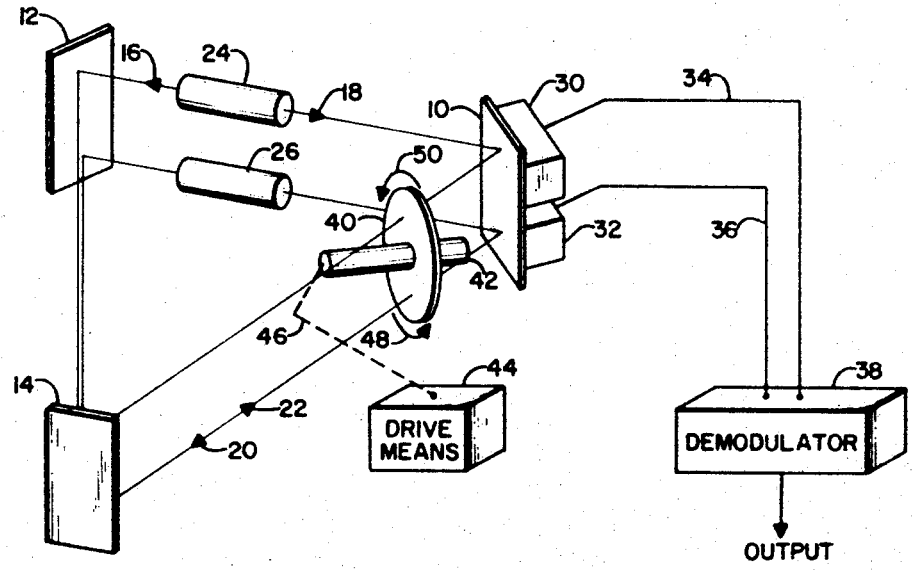
FIGURE 1 is a schematic diagram of a preferred embodiment of my invention.

In FIGURE 1 a set of three mirrors 10, 12, and 14 are shown which mirrors support two pairs of counter-rotating laser beams indicated by the arrows 16 and 18 for the first pair and the arrows 20 and 22 for the second pair. The beams are generated by a pair of sources 24 and 26 constructed according to principles well known to those skilled in the art. Small portions of the counter-rotating beams pass through mirror 10 to suitable detectors 30 and 32. Detector 30 operates to measure the difference in frequency between the two counter-rotating beams indicated by the arrows 16 and 18. Detector 32 operates to measure the difference in frequency between the two counter-rotating beams indicated by the arrows 20 and 22. Detectors 30 and 32 may be constructed in accordance with principles well known to those in the art and in particular may be the same as the frequency difference detecting means disclosed in co-pending patent application Ser. No. 445,171 now U.S. Patent No. 3,373,650 in the name of Joseph E. Killpatrick filed April 2, 1965 and assigned to the present assignee. Detectors 30 and 32 each generate an output signal of a frequency proportional to the difference in frequency between the counter-rotating beams. These signals are conveyed by a pair of conductors 34 and 36 to a demodulator 38. Demodulator 38, which may be constructed according to principles well known to those skilled in the art, operates to produce a signal at the difference frequency of the signals from detector 32 and detector 30. The difference between those two signals then becomes the ultimate output signal which will be more fully described hereinafter.

Interposed in the path of the counter-rotating beams is a spinning disc 40 constructed of a material which is substantially transparent, for example, glass or fused quartz, so that the laser beams may pass therethrough. The disc is arranged to spin about a shaft or axis 42 by means of a drive means 44 acting through a suitable mechanical connection indicated by the dashed line 46. As should be evident from the drawing disc 40 is positioned obliquely with respect to the paths of the laser beams so that when disc 40 is rotated in the direction indicated by a pair of arrows 48 and 50 the beams pass through a substantially transparent medium which is moving with a component of motion in the same direction as one beam but opposite to the direction of the other beam. This causes an effective change in the index of refraction of disc 40 in accordance with the "Fresnel Drag" effect so that the counter-rotating beams indicated by arrows 16 and 18 are presented with effectively different path lengths and, therefore, oscillate at different frequencies. Likewise the two counter-rotating beams indicated by arrows 22 and 20 also have effectively different path lengths and operate at different frequencies. However, because of the position of the disc the motion of the material of disc 40 is in the opposite direction for the lower set of beams so that the difference in frequency created in beams 20 and 22 is in the reverse sense with respect to the counter-rotating beams 16 and 18. A brief mathematical analysis is advantageous in further clarifying this effect.

The frequency difference measured by detector 30, $\Delta F_1$ is composed of two components, namely, the difference in frequency $\Delta F_R$ due to rotation of the system and the difference in frequency $\Delta F_d$ due to the effect of spinning disc 40. In equation form this may be written $$\Delta F_1 = \Delta F_R + \Delta F_d \quad (1)$$

The frequency difference $\Delta F_2$ measured by detector 32 may be written $$\Delta F_2 = \Delta F_R - \Delta F_d \quad (2)$$

where the quantity $\Delta F_d$ has a minus sign because the disc is moving in the opposite direction for the lower set of beams. $\Delta F_d$ and $\Delta F_R$ are of equal magnitude in both equations, since the speed of the disc is the same at the ends of any diameter, and since both beams are the same shape and size and enclose the same area. That is to say that the beam pairs sense rotation identically but are biased in opposite senses.

Demodulator 38 gives an ultimate output representative of the difference between the absolute values of the signals on conductors 34 and 36. From Equations 1 and 2

$$|\Delta F_1| = |\Delta F_R + \Delta F_d| \quad (3)$$

and $$|\Delta F_2| = |\Delta F_R - \Delta F_d| \quad (4)$$

Disc 40 is rotated at such a speed that $\Delta F_d$ is always larger than the $\Delta F_R$ to be measured. Then from Equations 3 and 4

$$|\Delta F_1| = \Delta F_R + \Delta F_d \quad (5)$$

and $$|\Delta F_2| = \Delta F_d - \Delta F_R \quad (6)$$

The output of demodulator 38 is now formed by subtracting Equation 6 from Equation 5, as follows:

$$|\Delta F_1| - |\Delta F_2| = \Delta F_R + \Delta F_d - (\Delta F_d - \Delta F_R) = 2\Delta F_R \quad (7)$$

Thus the effects of the bias $\Delta F_d$ cancel out and the ultimate output is proportional to the rotation rate of the system.

$$F_1 - F_2 = 2F_R$$

This output signal may be monitored by any suitable recording means, such as an electronic counter, to keep track of the amount of rotation.

It should be noted in FIGURE 1 that the velocity of the material in disc 40 along the laser beam path is dependent on the point at which the laser beam passes through the spinning disc. If the laser beams pass through farther away from the axis of spin, at a greater radius, the velocity component of the material along the laser beam path is greater. This may cause an undesirable variation in the bias frequency if the beams move laterally. Apparatus to avoid this result is schematically shown in FIGURE 2.

Figure 2:
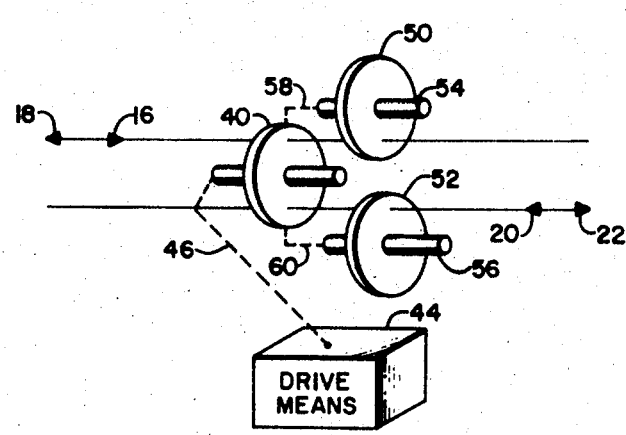
FIGURE 2 is a schematic diagram showing a compensated version of my invention in which the frequency bias is independent of lateral displacement of the counter-rotating beams.

In FIGURE 2 beams 16, 18, 20, and 22 are again shown passing obliquely through spinning disc 40. Drive means 44 is again shown driving disc 40 by means of suitable mechanical connections shown as dashed line 46. Included in the apparatus are two additional rotating discs of substantially transparent material 50 and 52 which are adapted to spin about shafts or axes 54 and 56 respectively. Disc 50 is driven by disc 40 through a suitable mechanical connection shown as dashed line 58. Disc 52 is driven from disc 40 by means of a suitable mechanical connection shown as dashed line 60. Disc 50 is inclined and rotated so as to create a velocity component along beams 16 and 18 in the same direction as does disc 40, and disc 52 is similarly inclined and rotated so as to create a velocity component along beams 20 and 22 in the same direction as does disc 40. Reference to FIGURE 2 will show that if the beams 16, 18, 20, and 22 are displaced laterally, that is toward the top or bottom of the page in FIGURE 2, that the change in biasing effect on disc 40 will be offset by the change in biasing effect in discs 50 and 52. For example, if beams 16 and 18 move upwards they will detect a greater velocity component from disc 40 but a lesser velocity component from disc 50. The same compensation is available to beams 20 and 22.

It is clear that various modifications may be made to the apparatus disclosed herein. Consequently, I do not intend the present invention to be limited to the particular embodiment and apparatus shown in the drawings except as defined by the appended claims.

I claim:

1. Apparatus of the class described comprising in combination:
    means for generating two pairs of light beams, each pair comprising two substantially monochromatic beams traveling in opposite directions;
    reflecting means for supporting separately said two pairs of light beams about first and second parallel closed loop paths;
    a first body of substantially transparent material in the paths of said two pairs of light beams;
    driving means for moving said first body so that said transparent material has a velocity along said first path and a substantially equal and opposite velocity along the second path so as to present a velocity dependent index of refraction to the beams; and
    means for comparing the difference in frequency between the first pair of beams with the difference in frequency between the second pair of beams whereby the difference in frequency between the first and second pair of beams is proportional to the rotational rate.

2. The apparatus of claim 1 in which said first body comprises a generally disc shaped body positioned obliquely in the path of said light beams; and
    said driving means comprises means to rotate said body about an axis which axis extends through said body.

3. The apparatus of claim 1 including second and third bodies of substantially transparent material, positioned in said first and second paths respectively, which bodies are adapted to move in accordance with said first body so as to have velocities along said first and second paths, which velocities vary depending upon the position at which said beams pass through said second and third bodies so that displacement of the beams has a substantially negligible effect on the index of refraction presented to said beams.

4. The apparatus of claim 3 in which said bodies comprise generally disc shaped bodies positioned obliquely in the paths of said light beams; and
    said driving means comprises means to rotate said bodies about axes which extend through the bodies.

5. In a device wherein a first pair of counter-rotating laser beams are compared in frequency to sense the rotation thereof, apparatus to prevent frequency lock-in of the two beams of light comprising:
    a spinning transparent disc in the path of the first pair of beams operable to present effectively different path lengths to the first pair of beams;
    means to generate and direct a second pair of counter-rotating laser beams of substantially the same shape and size as said first pair of beams through said disc at a different point on the disc such that the second pair have effectively different path lengths in the reverse sense with respect to the effectively different path lengths of the first pair of beams; and
    means for comparing the difference in frequency between the first pair of beams with the difference in frequency between the second pair of beams whereby the difference in frequency between the first and second pair of beams is proportional to the rotational rate.

6. The apparatus of claim 5 including two compensating spinning discs of substantially transparent material positioned one each in said first and second pair of counter-rotating laser beams so as to present effectively different path lengths to the counter-rotating beams in each pair; and
    driving means to drive said spinning disc and said two compensating discs at substantially uniform speeds relative to each other.

7. The apparatus of claim 6 wherein said discs are positioned obliquely in the paths of the beams and spun by said driving means so that said spinning disc has a component of velocity along the first pair of beams and an equal and opposite component of velocity along said second pair of beams and so that one of said compensating discs has a component of velocity along said first pair of beams in the same direction as said spinning disc and the other of said compensating discs has an equal and opposite component of velocity along said second pair of beams also in the same direction as said spinning disc.

References Cited

"Electromagnetic Angular Rotation Sensing," W. Macek et al., Sperry Gyroscope Company, Great Neck, N.Y., August 1964; pp. 77–82.

RONALD L. WIBERT, Primary Examiner

V. P. McGRAW, Assistant Examiner